US010708893B2

(12) United States Patent
Hong et al.

(10) Patent No.: US 10,708,893 B2
(45) Date of Patent: Jul. 7, 2020

(54) METHOD FOR TRANSMITTING CHANNEL STATE INFORMATION AND DEVICE THEREFOR

(71) Applicant: KT CORPORATION, Gyeonggi-do (KR)

(72) Inventors: Sung-pyo Hong, Seoul (KR); Kyujin Park, Seoul (KR); KyungJun Lee, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 5 days.

(21) Appl. No.: 15/556,028

(22) PCT Filed: Mar. 8, 2016

(86) PCT No.: PCT/KR2016/002281
§ 371 (c)(1),
(2) Date: Sep. 6, 2017

(87) PCT Pub. No.: WO2016/144078
PCT Pub. Date: Sep. 15, 2016

(65) Prior Publication Data
US 2018/0049186 A1    Feb. 15, 2018

(30) Foreign Application Priority Data

Mar. 9, 2015 (KR) .................. 10-2015-0032665
Feb. 24, 2016 (KR) .................. 10-2016-0021712

(51) Int. Cl.
*H04W 72/04* (2009.01)
*H04L 5/00* (2006.01)

(52) U.S. Cl.
CPC ......... *H04W 72/0413* (2013.01); *H04L 5/001* (2013.01); *H04L 5/0032* (2013.01);
(Continued)

(58) Field of Classification Search
None
See application file for complete search history.

(56) References Cited

U.S. PATENT DOCUMENTS

| 9,300,459 B2* | 3/2016 | Lee ............... H04W 56/0045 |
| 2012/0257513 A1* | 10/2012 | Yamada ............ H04L 1/0618 |
| | | 370/248 |

(Continued)

FOREIGN PATENT DOCUMENTS

| KR | 10-2013-0124755 A | 11/2013 |
| KR | 10-2013-0125721 A | 11/2013 |
| WO | 2015/023128 A1 | 2/2015 |

OTHER PUBLICATIONS

CATT, "Introduction of PUCCH Cell Group", R2-150263, 3GPP TSG RAN WG2 Meeting #89, Athens, Greece, Feb. 9-13, 2015, pp. 1-3.

(Continued)

*Primary Examiner* — Gregory B Sefcheck
*Assistant Examiner* — Suk Jin Kang
(74) *Attorney, Agent, or Firm* — IP Legal Services, LLC

(57) ABSTRACT

Provided are a method and a device for transmitting channel state information by using a PUCCH of an SCell when providing carrier aggregation (CA) or dual connectivity (DC) in a E-UTRAN. The method may include: configuring a carrier aggregation by using one primary cell (PCell) and a plurality of secondary cells (SCells) controlled by a base station; receiving an upper layer signaling including configuration information for configuring a physical uplink control channel (PUCCH) transmission function in at least one cell among the plurality of secondary cells; receiving, by using the configuration information, a MAC control element in which activation state indication information for a PUCCH SCell having an uplink control channel transmission function is included; and transmitting channel state (Continued)

information on the PUCCH SCell after the PUCCH SCell is activated according to the activation state indication information.

12 Claims, 6 Drawing Sheets

(52) U.S. Cl.
CPC ....... *H04L 5/0053* (2013.01); *H04W 72/0446* (2013.01); *H04L 5/0098* (2013.01)

(56) References Cited

U.S. PATENT DOCUMENTS

| | | | | |
|---|---|---|---|---|
| 2014/0192775 A1* | 7/2014 | Li | ...................... | H04W 36/0072 370/331 |
| 2014/0349713 A1* | 11/2014 | Yamada | ................ | H04L 1/0618 455/561 |
| 2015/0036614 A1* | 2/2015 | Lee | .................. | H04W 56/0045 370/329 |
| 2015/0049739 A1* | 2/2015 | Lee | .................. | H04W 56/0045 370/336 |
| 2015/0085760 A1* | 3/2015 | Yamada | ................ | H04W 24/10 370/329 |
| 2015/0103771 A1* | 4/2015 | Kim | .................. | H04W 56/0005 370/329 |
| 2015/0245307 A1* | 8/2015 | Chen | ................ | H04W 56/0045 370/336 |
| 2015/0304915 A1* | 10/2015 | Uchino | ................ | H04W 76/36 370/329 |
| 2015/0382345 A1* | 12/2015 | Yamada | ................ | H04L 1/0618 370/329 |
| 2016/0205681 A1* | 7/2016 | Kim | .................... | H04B 7/2656 370/329 |
| 2016/0212737 A1* | 7/2016 | Jang | ........................ | H04L 69/22 |
| 2016/0262118 A1* | 9/2016 | Kim | .................... | H04W 52/365 |
| 2016/0309417 A1* | 10/2016 | Han | .................... | H04W 52/36 |
| 2016/0323873 A1* | 11/2016 | Takeda | .................... | H04L 5/001 |
| 2016/0338139 A1* | 11/2016 | Kwon | ................... | H04W 76/38 |
| 2017/0048053 A1* | 2/2017 | Kim | .................. | H04W 52/0216 |
| 2017/0201308 A1* | 7/2017 | Park | ........................ | H04B 17/24 |
| 2017/0208579 A1* | 7/2017 | Uchino | .................. | H04L 69/28 |
| 2017/0238323 A1* | 8/2017 | Marinier | ............... | H04W 72/06 370/329 |
| 2017/0303136 A1* | 10/2017 | Park | ........................ | H04W 74/08 |
| 2017/0332408 A1* | 11/2017 | Dinan | .............. | H04W 56/0005 |
| 2017/0373805 A1* | 12/2017 | Lee | ........................ | H04L 1/1812 |
| 2017/0374665 A1* | 12/2017 | Lee | .................. | H04W 72/0413 |
| 2018/0007680 A1* | 1/2018 | Lee | ........................ | H04L 1/1893 |
| 2018/0007731 A1* | 1/2018 | Park | ........................ | H04W 76/20 |
| 2018/0020429 A1* | 1/2018 | Aiba | ......................... | H04J 1/00 |
| 2018/0020430 A1* | 1/2018 | Aiba | ..................... | H04W 24/10 |
| 2018/0049184 A1* | 2/2018 | Lee | ........................ | H04L 5/001 |
| 2018/0077734 A1* | 3/2018 | Kim | ........................ | H04L 1/18 |
| 2018/0123746 A1* | 5/2018 | Dinan | ..................... | H04L 5/00 |
| 2018/0160420 A1* | 6/2018 | Kim | ........................ | H04L 5/0007 |
| 2018/0213518 A1* | 7/2018 | Jang | ........................ | H04L 69/22 |
| 2018/0220375 A1* | 8/2018 | Yang | .................. | H04W 52/146 |
| 2018/0288760 A1* | 10/2018 | Lee | ........................ | H04L 1/1854 |
| 2018/0343102 A1* | 11/2018 | Sebire | ..................... | H04L 5/001 |

OTHER PUBLICATIONS

Huawei et al., "Introduce PUCCH on SCell for CA beyond 5 carriers", R2-150372, 3GPP TSG-RAN WG2 Meeting #89, Athens, Greece, Feb. 9-13, 2015, pp. 1-8.

Inter Corporation, "Considerations for PUCCH on SCell in carrier aggregation", R2-150169, 3GPP TSG RAN WG2 Meeting #89, Athens, Greece, Feb. 9-13, 2015, pp. 1-4.

* cited by examiner

METHOD FOR TRANSMITTING CHANNEL STATE INFORMATION AND DEVICE THEREFOR

CROSS REFERENCE TO RELATED APPLICATIONS

This application is a National Stage Patent Application of PCT International Patent Application No. PCT/KR2016/002281 (filed on Mar. 8, 2016) under 35 U.S.C. § 371, which claims priority to Korean Patent Application Nos. 10-2015-0032665 (filed on Mar. 9, 2015), and 10-2016-0021712 (filed on Feb. 24, 2016), the teachings of which are incorporated herein in their entireties by reference.

TECHNICAL FIELD

The present disclosure relates to a method and device for transmitting channel state information using a physical uplink control channel (PUCCH) of a secondary cell (SCell) for providing carrier aggregation (CA) or dual connectivity (DC) in an evolved UMTS terrestrial radio access network (E-UTRAN).

BACKGROUND ART

Due to the development of communications systems, a wide range of wireless terminals have been introduced to consumers. Lastly, mobile communications systems have been employed the $3^{rd}$ generation partnership project (3GPP) technologies, such as long term evolution (LTE) and LTE-Advanced. Such mobile communication systems are high-speed and high-capacity communications systems that may transmit various types of data, voice and data at a high speed. may Such high-speed and high-capacity communications systems require technology for improving the capacity of a terminal using a small cell. In addition, in order to improve the capacity of a terminal using a small cell, it may require a technology enabling terminals for transmitting and receiving data by connecting a plurality of base stations together when the small cells are used. In this regard, there are many researches made for developing i) technology for dual connectivity (DC) that aggregates one or more cells controlled by two or more base stations and ii) technology for processing a large amount of data at a high speed by aggregating one or more cells and carrier aggregation (CA).

As described, there are many studied made for developing technologies for processing a large amount of data at a high speed by aggregating a plurality of cells through the dual connectivity (DC) or the carrier aggregation (CA). However, since uplink control information (e.g. channel state information) is transmitted and received through a single cell (e.g. a primary cell (PCell) or a primary secondary cell (PSCell)) for each base station, the load for uplink signals of cells transmitting the uplink control information increases with increases in the number of cells subjected to CA. This may cause a problem in terms of efficient data processing.

DISCLOSURE

Technical Problem

Accordingly, the present disclosure has been made in consideration of the above-described problems occurring in the related art, and the present disclosure proposes a method and device for reducing a load of a specific cell performing a channel state information transmission when transmitting and/or receiving data by aggregating a plurality of cells through carrier aggregation (CA) or dual connectivity (DC).

Also provided are a method and device for preventing errors in channel state information transmission by setting a timing of transmitting channel state information according to changes in activating a cell having a physical uplink control channel (PUCCH) transmission function when user equipment (UE) performs communications using a plurality of cells controlled by a single base station.

Technical Solution

According to an aspect of the present disclosure, provided is a method of transmitting channel state information by user equipment that configures carrier aggregation. The method may include: configuring CA using a single primary cell (PCell) and a plurality of secondary cells (SCells) controlled by a base station; receiving a higher layer signal including configuration information for configuring a PUCCH transmission function is configured in at least one SCell among the plurality of SCells; receiving a medium access control (MAC) control element including activation state indication information regarding a PUCCH SCell having the PUCCH transmission function configured based on the configuration information; and after the PUCCH SCell is activated according to the activation state indication information, transmitting channel state information in the PUCCH SCell.

Also provided is a method of receiving channel state information by a base station. The method may include: configuring, by the base station, CA together with user equipment using a single PCell and a plurality of SCells controlled thereby; transmitting a higher layer signal including configuration information for configuring a PUCCH transmission function in at least one SCell among the plurality of SCells; transmitting a MAC control element including activation state indication information regarding the PUCCH SCell having the PUCCH transmission function; and after the PUCCH SCell is activated according to the activation state indication information, receiving channel state information in the PUCCH SCell.

Also provided is user equipment transmitting channel state information. The user equipment may include: a controller configured to configure CA using a single PCell and a plurality of SCells controlled by a base station; a receiver configured to receive a higher level signal including configuration information for configuring a PUCCH transmission function in at least one SCell of the plurality of SCells, and receive a MAC control element including activation state indication information regarding a PUCCH SCell having the PUCCH transmission function configured based on the configuration information; and a transmitter configured to transmit channel state information in the PUCCH SCell after the PUCCH SCell is activated according to the activation state indication information.

Also provided is a base station receiving channel state information. The base station may include: a controller is configured to configure CA together with user equipment using a single PCell and a plurality of SCells controlled thereby; a transmitter configured to transmit a higher layer signal including configuration information for configuring a PUCCH transmission function in at least one SCell among the plurality of SCells, and transmit a MAC control element including activation state indication information regarding the PUCCH SCell having the PUCCH transmission function; and a receiver configured to receive channel state information in the PUCCH SCell after the PUCCH SCell is activated according to the activation state indication information.

Advantageous Effects

The present disclosure provides an effect of reducing a load of a specific cell performing a channel state information transmission when transmitting and/or receiving data by aggregating a plurality of cells through CA or DC.

In addition, the present disclosure provides an effect of preventing errors in channel state information transmission by setting a timing of transmitting channel state information according to changes in activating a cell having a PUCCH transmission function when user equipment performs communications using a plurality of cells controlled by a single base station.

MODE FOR INVENTION

Figure 1:
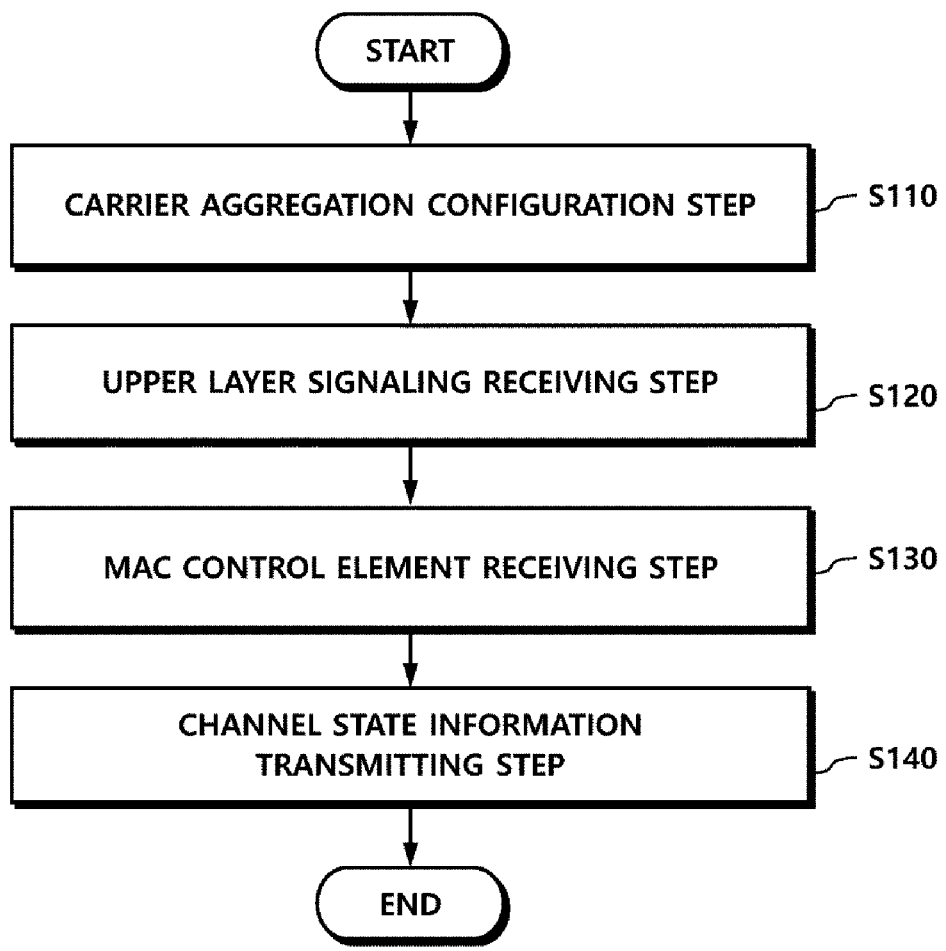
FIG. 1 is a flowchart illustrating operations of user equipment according to an embodiment of the present disclosure.

Hereinafter, specific embodiments of the present disclosure will be described in detail with reference to illustrative drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Herein, multi-terminal connection (MTC) user equipment (UE) may refer to i) user equipment supporting a low-cost strategy (or low complexity) or ii) user equipment supporting coverage enhancement. In addition, herein, the MTC user equipment may refer to user equipment supporting both the low-cost strategy (or low complexity) and coverage enhancement. Alternatively, the MTC user equipment used herein may refer to user equipment defined as a specific category for supporting low cost strategy (or low complexity) and/or coverage enhancement.

In this specification, the MTC user equipment may refer to a newly-defined 3GPP Release 13 low cost (or low complexity) UE category/type user equipment performing MTC-related operations on the basis of long-term evolution (LTE). Alternatively, the MTC user equipment may refer to a UE category/type user equipment defined in the 3GPP Release 12 or previous versions that support improved coverage, compared to typical LTE coverage or support low-power consumption or a newly-defined Release 13 low cost (or low complexity) UE category/type user equipment.

Wireless communications systems according to the present disclosure are widely deployed to provide a range of communications services, such as voice and packet data. Wireless communications systems include user equipment (UE) and base stations (BSs) or evolved node Bs (eNBs). As used in the specification, the term "user equipment" should be interpreted as having a comprehensive meaning indicating a wireless communications user equipment, including not only user equipment used in wideband code division multiple access (WCDMA), long-term evolution (LTE), high speed packet access (HSPA), and the like, but also all of a mobile station (MS), a user terminal (UT), a subscriber station (SS), a wireless device, and the like, used in the global system for mobile communications (GSM).

A base station or cell typically refers to a station that communicates with user equipment, and may also be referred to using any other term, such as a node B, an evolved node B (eNB), a sector, a site, a base transceiver system (BTS), an access point (AP), a relay node, a remote ratio head (RRH), a radio unit (RU), a small cell, or the like.

Herein, the base station or cell should be interpreted as a comprehensive term indicating a partial area or function covered by a base station controller (BSC) in CDMA, a node B in WCDMA, an eNB or a sector (or site) in LTE, or the like. In addition, the base station or cell comprehensively indicates a variety of coverage areas, such as a mega cell, a macro cell, a microcell, a picocell, a femtocell, and communications ranges of a relay node, an RRH, an RU, and a small cell.

A variety of cells as stated above are controlled by base stations. The base station may be interpreted in two senses. Each of the base stations i) may be an apparatus itself that provides a mega cell, a macro cell, a microcell, a picocell, a femtocell, or a small cell in relation to a wireless communications area, or ii) may indicate the wireless communications area itself. In i), the base station may be a device forming a wireless area or interacting with another to form a wireless area in a coordinated manner. The base station may include an eNB, an RRH, an antenna, an RU, a low power node (LPN), a point, a transceiver point, a transmission point, a reception point, and the like, depending on the configuration of the wireless area. In ii), the base station may be the wireless area itself in which a signal is received or transmitted in terms of a user or an adjacent base station.

Thus, the base station may be referred as the mega cell, the macro cell, the microcell, the picocell, the femtocell, the small cell, the RRH, the antenna, the RU, the LPN, the point, the eNB, the transceiver point, the transmission point, and the reception point.

Herein, the user equipment and the base station comprehensively refer to two types of transmission/reception entities for realizing technologies or technical concepts described herein and are not limited by terms or words that are explicitly defined. The user equipment and the base station are comprehensively used as two (uplink or downlink) transmission/reception entities for realizing technologies or technical concepts described herein and are not limited by terms or words that are explicitly defined. Here, the term "uplink (UL)" relates to data transmission/reception in which data is transmitted from the user equipment to the base station, whereas the term "downlink (DL)" relates to data transmission/reception in which data is transmitted from the base station to the user equipment.

There are no limitations in multiple access technologies applied to the wireless communications system. A variety of multiple access methods, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, may be used. An exemplary embodiment of the present disclosure is applicable for the allocation of resources in asynchronous wireless communications evolving into LTE and LTE-Advanced through GSM, WCDMA, and high-speed packet access (HSPA) and synchronous wireless communications evolving into CDMA, CDMA-2000, and ultra-mobile broadband (UMB). The present disclosure should not be interpreted as being limited or restricted to a specific field of wireless communications and should be interpreted as covering all technical fields to which the concept of the present disclosure is applicable.

Uplink (UL) transmission and downlink (DL) transmission may employ time division duplex (TDD) in which transmission is performed at different fractions of time or frequency division duplex (FDD) in which a transmission is performed at different frequencies.

In addition, a system such as LTE or LTE-Advanced forms standards by forming an uplink and a downlink, based on a single carrier wave or a pair of carrier waves. The uplink and the uplink transmit control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH). In addition, the uplink and the downlink are constituted of a data channel, such as a physical downlink shared channel (PDSCH) or a physical uplink shared channel (PUSCH), to transmit data.

In addition, control information may be transmitted using an enhanced or extended PDCCH (EPDCCH).

Herein, the cell may refer to coverage of a signal transmitted from a transmission point or a transmission/reception point, a component carrier having the coverage of the signal transmitted from the transmission point or the transmission/reception point, or the transmission point or the transmission/reception point.

The wireless communications system to which embodiments are applied may be a coordinated multi-point transmission/reception (CoMP) system, in which two or more transmission/reception points transmit a signal in a coordinated manner, a coordinated multi-antenna transmission system, or a coordinated multi-cell communications system. The CoMP system may include at least two multi-transmission/reception points and user terminals.

The multi-transmission/reception points may be a base station or a macro cell (hereinafter referred to as an "eNB") and at least one RRH connected to the eNB via a fiber optic cable or an optical fiber and controlled by wires. The RRH has high transmission power, or has low transmission power within the area of the macro cell.

Hereinafter, the downlink refers to communications from each multi-transmission/reception point to user equipment or a path for such communications. The uplink refers to communications from the user equipment to the multi-transmission/reception point or a path for such communications. In the DL, a transmitter may be a portion of the multi-transmission/reception point, and a receiver may be a portion of the user equipment. In the UL, the transmitter may be a portion of the user equipment, and the receiver may be a portion of the multi-transmission/reception point.

Hereinafter, when a signal is transmitted/received via a channel, such as the PUCCH, PUSCH, PDCCH, EPDCCH, or physical PDSCH, it may be described that "a PUCCH, PUSCH, PDCCH, EPDCCH, or PDSCH is transmitted/received."

In addition, hereinafter, transmitting or receiving a PDCCH or transmitting or receiving a signal on the PDCCH may refer to transmitting or receiving an EPDCCH or transmitting or receiving a signal on the EPDCCH.

That is, the PDCCH described hereinafter indicates the PDCCH or the EPDCCH, or is used in the sense of including both the PDCCH and the EPDCCH.

For the convenience of explanation, the EPDCCH may be applied as an embodiment of the present disclosure to the portion described as the PDCCH, and the PDCCH may be applied, as an embodiment of the present disclosure, to the portion described as the EPDCCH.

In the meantime, higher layer signaling described hereinafter includes radio resource control (RRC) signaling to transmit RRC information including an RRC parameter.

The eNB performs downlink transmission to user equipment. The eNB may transmit a physical downlink shared channel (PDSCH), which is a main channel for unicast transmission, and a physical downlink control channel (PDCCH), on which downlink control information, such as scheduling necessary for the reception of the PDSCH, and scheduling approval information for transmission on an uplink data channel (e.g. a physical uplink shared channel (PUSCH)) are transmitted. Hereinafter, the transmission of a signal on each channel will be described as the transmission of the corresponding channel.

Herein, data transmission/reception using two or more component carriers is referred to as carrier aggregation (CA), whereas data transmission/reception by aggregating a cell controlled by another base station is referred to as dual connectivity (DC).

In typical CA technology, multiple uplink timing advance DC technology and FDD-TDD CA technology are added. However, typical CA-related technologies (such as CA and DC) may aggregate up to five carriers to user equipment.

Recently, in 3GPP Release 13, an LTE technology study (e.g. licensed-assisted access (LAA)) of utilizing unlicensed frequency bands is being discussed as an attempt to deal with rapid increases in the amount of mobile data traffic. In LAA technology, prerequisites necessary for the use of unlicensed portions of the 5 GHz band spectrum, based on CA technology (or CA related technology), are being discussed.

As the discussion of the development of CA technology evolves, it may be required to aggregate a plurality of carriers exceeding five typical carriers. For example, it may be necessary to aggregate five or more carriers to enable the use of a bandwidth similar to at least IEEE 802.11ac Wave 2 through LAA with respect to LTE. In addition to existing LTE bands, other frequency bands, such as 3.5 GHz, may be used for aggregating five or more carriers. When CA technology is expanded for the aggregation of five or more carriers, an operator may have opportunity to more efficiently use a spectrum available for communications demand.

However, with increases in component carriers (CCs) aggregated with user equipment that may configure CA, a greater amount of load may be applied to a cell used as a PCell. One of the causes thereof may be major functions (e.g. PUCCH transmission) that are only applied to the PCell.

In typical DC, user equipment feedback uplink control information (e.g. regarding a scheduling request (SR), a hybrid automatic repeat request-acknowledgement (HARQ- ACK), and/or channel state information (CSI)) related to a master cell group (MCG) may only be transmitted to a master eNB (MeNB), whereas user equipment feedback uplink control information (e.g. regarding the SR, HARQ-ACK, and/or CSI) related to a secondary cell group (SCG) may only be transmitted to a secondary eNB (SeNB). In addition, in the MCG, a PUCCH for the MCG may only be supported in the PCell. In the SCG, a PUCCH for the SCG may only be supported in a primary secondary cell (PSCell). The PCell allowing all PUCCH transmissions may have a clear effect on the performance of not only CA user equipment but also non-CA user equipment.

To overcome this, an attempt of providing a PUCCH in an SCell may be considered. For example, the user equipment may cause UCI (e.g. information regarding at least one of the HARQ-ACK, CSI reporting, and SR) to be transmitted through the SCell providing a PUCCH transmission function. Here, the CSI report refers to at least one of a channel quality indicator (CQI) report, a precoding matrix indicator (PMI) report, a precoding type indicator (PTI) report, and a rank indicator (RI) report. Alternatively, the CSI report may be composed of at least one of a CQI, a PMI, a PTI, and RI controlled by a base station.

However, no detailed procedures are provided to a method of providing a PUCCH in the SCell, the method being considered to be a method of distributing a PUCCH transmission load.

Herein, a cell in which user equipment and a base station configure an RRC connection and based on which handover is performed is referred to as a PCell. A base station that is discriminated from the MeNB and provides additional wireless resources to the user equipment when dual connectivity (DC) is configured between the user equipment and the base station is referred to as a secondary eNB (SeNB). In addition, a cell performing the functions of the PCell among cells controlled by the SeNB is referred to as a PSCell. Thus, when the user equipment configures carrier aggregation (CA) through a plurality of cells controlled by a single base station, a single PCell may be present. Alternatively, when the user equipment configures DC with two base stations, one of cells controlled by a master eNB (MeNB) is set to be a PCell, while one of cells controlled by an SeNB is set to be a PSCell. In addition, cells controlled by an MeNB during a DC case are referred to as belonging to a master cell group, and cells controlled by an SeNB are referred to as belonging to a secondary cell group.

Herein, a cell having a PUCCH transmission function among SCells is referred to as a PUCCH SCell, while a group of SCells that transmit uplink control information through the PUCCH SCell is referred to as a PUCCH group or an SCell PUCCH group. In addition, a group of SCells transmitting uplink control information through the PCell or the PSCell is referred to as a primary PUCCH group or a PCell PUCCH group.

The above-described terms are provided for the convenience of explanation and should not be interpreted as being limited.

FIG. 1 is a flowchart illustrating operations of user equipment (UE) according to an embodiment of the present disclosure.

According to the present disclosure, provided is a method of transmitting channel state information by user equipment that configures carrier aggregation (CA). The method includes: configuring CA using a single primary cell (PCell) and a plurality of secondary cells (SCells) controlled by a base station; receiving a higher layer signal including configuration information for configuring a physical uplink control channel (PUCCH) transmission function in at least one SCell among the plurality of SCells; receiving a medium access control (MAC) control element including activation state indication information regarding a PUCCH SCell having the PUCCH transmission function configured based on the configuration information; and after the PUCCH SCell is activated according to the activation state indication information, transmitting channel state information in the PUCCH SCell.

Referring to FIG. 1, in step S110, the user equipment configures CA using a single PCell and a plurality of SCells controlled by a base station. The user equipment may configure CA using a plurality of cells controlled by a single base station. For example, the user equipment may configure CA using a single PCell and a plurality of SCells. Alternatively, the user equipment may configure DC using a plurality of cells controlled by a master eNB (MeNB) and a plurality of cells controlled by a secondary eNB (SeNB). The configuration of DC may also be regarded as CA in a broad sense, in that communications are performed by aggregating a plurality of cells. That is, the user equipment configures CA when the MeNB and the SeNB configuring DC are respectively considered. Thus, the term CA, to be described hereinafter, will be described as collectively including DC.

When the user equipment configures CA using a plurality of cells controlled by a single base station, a single cell is set to be a PCell, while the other cells are set to be SCells. The user equipment may receive information necessary for the configuration of CA from the base station. For example, the user equipment may receive information regarding cells used for the configuration of CA from the base station.

In addition, in step S120, the user equipment receives the higher layer signal including the configuration information which is used for configuring the physical uplink control channel (PUCCH) transmission function in at least one of the plurality of SCells. When the user equipment configures CA using the single PCell and the plurality of SCells, the user equipment may receive the configuration information for configuring at least one of the plurality of SCells as a PUCCH SCell, from the base station. That is, when the user equipment configures CA using more than five cells, in a related-art case in which only the PCell is provided with the PUCCH transmission function, there is a problem in transmitting uplink control information of all SCells through the PCell. This causes an excessive load in the uplink signal transmission of the PCell, thereby lowering the efficiency of the system. Thus, according to the present disclosure, when the base station configures CA, the base station may be enabled to configure the Scell to perform the PUCCH transmission function in addition to the PCell. In this regard, the user equipment may receive configuration information for configuring the SCell having the PUCCH transmission function. The configuration information may be received through higher layer signaling (e.g. RRC signaling). In addition, when the PUCCH SCell is configured, each of the plurality of SCells, except for the PUCCH SCell, may be configured to be mapped to one of a primary PUCCH group and a second PUCCH group. In this case, at least one SCell mapped to the primary PUCCH group may transmit uplink control information including channel state information through the PCell, while at least one SCell mapped to the secondary PUCCH group may transmit uplink control information including channel state information through the PUCCH SCell. In this regard, the user equipment may additionally receive information regarding one or more SCells mapped to the secondary PUCCH group through higher layer signaling. Two or more PUCCH SCells may be provided, and each of the SCells may be configured to transmit uplink control information through one of the two or more PUCCH SCells or the PUCCH SCell of the PCell.

In addition, in step S130, the user equipment receives the MAC control element including the activation state indication information regarding the PUCCH SCell having the PUCCH transmission function based on the configuration information. Since the PUCCH SCell is also an SCell, a change in state may be applied. For example, the PUCCH SCell may be configured to be in an activated state or a deactivated state, and the change in state may be performed. In this regard, the user equipment may receive the activation state indication information indicating the activated state of the PUCCH SCell from the base station. The activation state indication information may be received by being included in the MAC control element.

In addition, in step S140, the user equipment transmits the channel state information in the PUCCH SCell after the PUCCH SCell is activated according to the activation state indication information. The user equipment may change the PUCCH SCell to an activated state according to the activation state indication information. Alternatively, when the activation state indication information indicates deactivation, the user equipment may change the PUCCH SCell to a deactivated state. For example, when the activation state indication information is received in subframe n, the user equipment may change the corresponding PUCCH SCell to an activated state in the $(n+8)^{th}$ subframe (i.e. the eighth subframe after n). A point in time of changing the activation state of the PUCCH SCell may vary depending on the hardware specifications of the user equipment. The PUCCH SCell may be activated within a predetermined period of time depending on predetermined requirements (e.g. 3GPP RAN WG4 requirements). For example, when the activation state indication information is received in subframe n, the user equipment may be changed to an activated state in a section ranging from subframe n+8 to subframe n+24 (or n+34). Since the subframe number may be set to be a number ranging from 0 to 9, when n is 1, subframe n+8 may be subframe 9 of the same wireless frame. Likewise, when n is 2, subframe n+8 may be subframe 0 of the next wireless frame. Hereinafter, for the convenience of explanation, n+8 will be described as being n+8, n+24, n+34, or the like, which may not be the same as the subframe number. That is, n+8, n+24, n+34, or the like should be understood as indicating the number of subframes after subframe n.

After the PUCCH SCell is activated, the user equipment transmits the channel state information. For example, when the PUCCH SCell is in a deactivated state, the user equipment does not transmit the channel state information of SCells belonging to the secondary PUCCH group that transmits channel state information through the corresponding PUCCH SCell. Only when the PUCCH SCell is changed to the activated state according to the activation state indication information, the user equipment transmits the channel state information. A point in time for transmitting the channel state information may be set to be the same as a point in time for activating the PUCCH SCell or may be set to any section after the PUCCH SCell is converted to the activated state.

When the PUCCH SCell is configured to be in the deactivated state, the SCells belonging to the secondary PUCCH group, in which the channel state information is transmitted through the corresponding PUCCH SCell, may also be configured to be in a deactivated state. That is, it may be determined whether or not to change the activation state of the SCells belonging to the corresponding secondary PUCCH group, depending on the activation state of the PUCCH SCell belonging to the corresponding secondary PUCCH group. In other words, when the PUCCH SCell is configured to be in the deactivated state, the SCells of the secondary PUCCH group are also configured to be in the deactivated state.

In addition, the PUCCH SCell may be changed from the deactivated state to the activated state without an SCell deactivation timer being applied. Unlikely, when each of the SCells belonging to the secondary PUCCH group is changed from the deactivated state to the activated state, an SCell deactivation timer is applied. When the SCell deactivation timer expires, the SCell belonging to the secondary PUCCH group enters the deactivated state. Thus, the activation state of the PUCCH SCell may only be changed in response to control by the base station, unlike the other SCells. The SCell deactivation timer may be provided in the user equipment in advance or according to the setting of the base station. When the provided SCell deactivation timer enters the activated state, the SCells, except for the PUCCH SCell, may be applied and start.

Hereinafter, operations of the user equipment and corresponding operations of the base station according to at least one embodiment of the present disclosure will be described in more detail.

Figure 2:
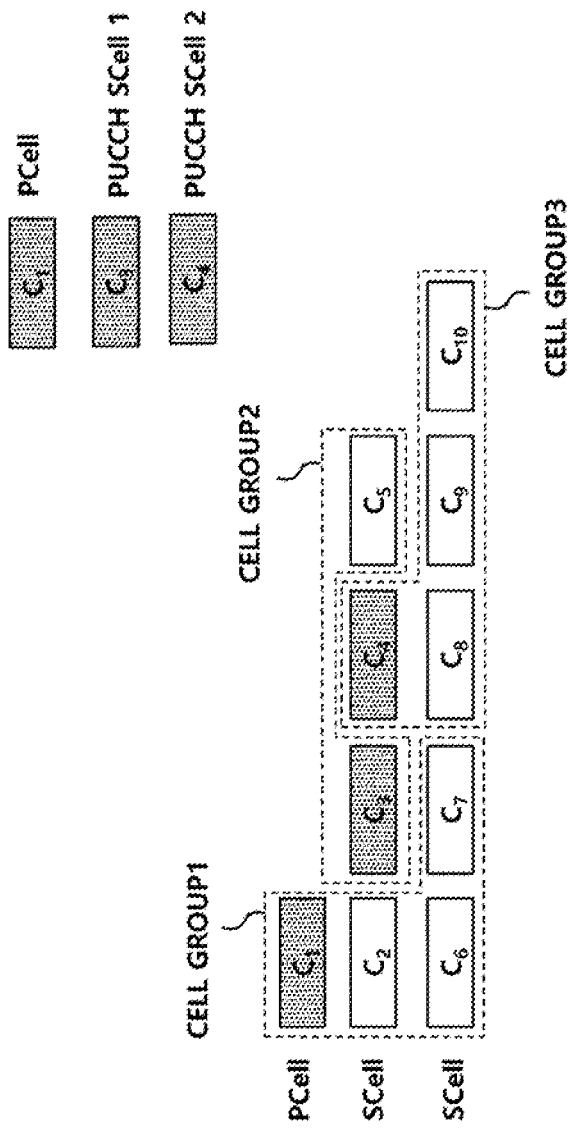
FIG. 2 illustrates PUCCH SCells in CA according to an embodiment of the present disclosure.
Figure 3:
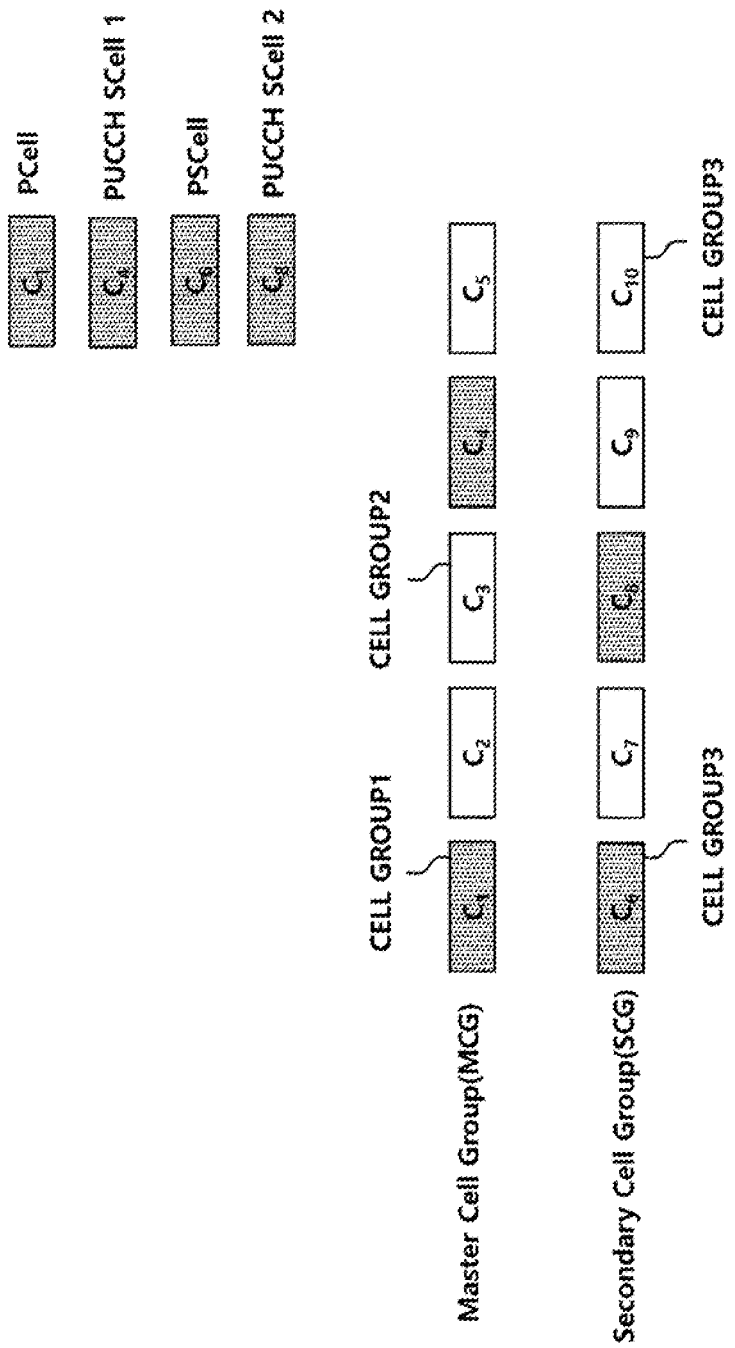
FIG. 3 illustrates PUCCH SCells in DC according to an embodiment of the present disclosure.

With reference to FIG. 2 and FIG. 3, operations of the PUCCH SCell when the user equipment configures CA, and operations of the PUCCH SCell when the user equipment configures DC, will be respectively described.

FIG. 2 illustrates configuration of a PUCCH SCell in the case of CA according to an embodiment of the present disclosure.

The user equipment may configure CA using a plurality of cells controlled by a single base station and may configure a PUCCH transmission function in at least one PUCCH SCell among SCells. In addition, the SCells transmitting uplink control information through the PUCCH SCell may be mapped to the PUCCH SCell. Likewise, the SCells transmitting uplink control information through the PCell may be mapped to the PCell.

Referring to FIG. 2, the user equipment may configure CA using ten cells controlled by the base station. For example, the user equipment may configure CA using ten cells ranging from C1 to C10. In this case, C1 is a PCell, while C2 to C10 are SCells. In addition, the user equipment may categorize the cells participating in CA as belonging to two or more groups in relation to PUCCH transmission function mapping. For example, the user equipment may categorize the cells as belonging to cell groups 1 to 3. Cell group 1 may consist of C1, C2, C6, and C7, with C1 being set to be a PCell to perform a PUCCH transmission function. In addition, cell group 2 may consist of C3 and C5, with C3 being set to be a PUCCH SCell to perform a PUCCH transmission function of cell group 2. Likewise, cell group 3 may consist of C4, C8, C9, and C10, with C4 being set to be a PUCCH SCell to perform a PUCCH transmission function of cell group 3.

As described above, in accordance with at least one embodiment, the user equipment and the base station may configure CA using more than five cells, in which at least one cell among cells controlled by a single base station may be set to be a PUCCH SCell and may be controlled to perform a PUCCH transmission function of a secondary PUCCH group. The number of cells of each group may be set variously, and SCells belonging to the cell group may be changed. That is, the cell groups may be dynamically set or changed depending on the necessity or activation of the SCells. For example, although cell group 2 includes C3 and C5, when C3 is deactivated, C5 may be changed to cell group 1 or cell group 2 to transmit uplink control information.

In addition, since C3 and C4 are also SCells, C3 and C4 may be changed to the activated or deactivated state. For example, the activation operation of the PUCCH SCell may be changed by the MAC control element of the base station, and the SCell activation state of the secondary PUCCH including the corresponding PUCCH SCell may be controlled in harmony with the activation operation of the PUCCH SCell. Specifically, the activation operations of the SCells belonging to the corresponding cell group may be determined according to the activation operation of the PUCCH SCell. In addition, when the PUCCH SCell is changed to the activated state, the secondary cell deactivation timer is not applied.

FIG. 3 illustrates configuration of a PUCCH SCell in the case of DC according to an embodiment of the present disclosure.

Referring to FIG. 3, embodiments of the present disclosure are applicable even in a case in which user equipment configures DC. The user equipment may configure DC with a master eNB (MeNB) and a secondary eNB (SeNB). In this case, the user equipment may perform communications using a plurality of cells controlled by the MeNB and a plurality of cells controlled by the SeNB. For example, the user equipment may configure master cell group (MCG) using five cells and a secondary cell group (SCG) using the other five cells. In this case, one cell of the MCG may be set as a PCell and one cell of the SCG may be set as a PSCell to perform a PUCCH transmission function. However, when the number of cells controlled by each base station increases, a large amount of load may be generated in the PUCCH transmission function of the PCell or the PSCell. In accordance with at least one embodiment of the present disclosure, a cell having the PUCCH transmission function may be additionally provided in each of the MCG and the SCG in order to control the large amount of load. That is, when C1 in the MCG is the PCell, C4 may be set as the PUCCH SCell and may be controlled to perform the PUCCH transmission function of cell group 2. Likewise, when C6 in the SCG is the PSCell, C8 may be set as the PUCCH SCell and may be controlled to perform the PUCCH transmission function of cell group 4.

As described above, referring to FIG. 3, the cells may be categorized as belonging to cell groups 1 to 4 with respect to the PUCCH transmission function. The SCells of each cell group may transmit uplink control information to the corresponding base station through one cell of the corresponding cell group. As described with reference to FIG. 2, the number of the cell groups and the number of the cells belonging to each cell group may be dynamically changed.

In addition, PUCCH SCells 1 and 2 may be applied such that the states thereof are changeable to activated or deactivated states, unlike the PCell and the PSCell. That is, the activation states of the PUCCH SCell may be changed. As described with reference to FIG. 2, the SCells of the secondary PUCCH group including the corresponding PUCCH SCell may be set to be changed to the deactivated states when the PUCCH SCell is activated. The number of the cell groups and the categorization of the cells as the cell groups, which have been described with reference to FIG. 2 and FIG. 3, are merely illustrative and may be variously set.

Hereinafter, the activation operations of a PUCCH SCell and SCells and the transmission timing of channel state information will be described in more detail.

As described above, the user equipment may map the PUCCH SCell and the other SCells belonging to the PUCCH SCell by RRC, using configuration information received through higher layer signaling. Hereinafter, SCells belonging to a secondary PUCCH group including a specific PUCCH SCell will be described as being "SCells belonging to the corresponding PUCCH SCell" as required.

In addition, since the PUCCH SCell is also an SCell, the activation/deactivation operation used for reducing the power consumption of the user equipment is applicable to the PUCCH SCell.

The MAC entity of the user equipment may perform the following operations with respect to each TTI and each SCell for activation and deactivation operations of the SCells.

When the MAC entity receives an activation/deactivation MAC control element that activates the SCell in the present transmission time interval (TTI), the MAC entity may perform the next operation in the TTI depending on the timing defined in the 3GPP TS 36.213 specification. 1) The SCell may be activated, and SCell operations may be applied. 2) The SCell deactivation timer (e.g. an SCell deactivation timer) associated with the SCell may be started or restarted.

(The MAC entity shall for each TTI and for each configured SCell:
if the MAC entity receives an Activation/Deactivation MAC control element in this TTI activating the SCell, the MAC entity shall in the TTI according to the timing defined in [TS 36.213]: 1) activate the SCell; i.e. apply normal SCell operation including; 2) start or restart the sCellDeactivationTimer associated with the SCell;)

Typical SCell operations as described above include at least one operation among SRS transmission in the SCell, CQI, PMI, RI, and PTI reporting for the SCell, PDCCH monitoring in the SCell, and PDCCH monitoring of the SCell.

When the activation/deactivation operation is provided to the PUCCH SCell, the user equipment (or base station) may operate at a predetermined point in time of SCell activation or deactivation for the PUCCH SCell, as described above.

The point in time of SCell activation or deactivation may be set as follows.

When the user equipment receives an activation command to the SCell in subframe n, corresponding actions may be applied no later than minimum requirements defined in the 3GPP TS 36.133 specification and no earlier than subframe n+8, except for the following operations that may be applied in subframe n+8.

The operations that may be applied in 3GPP TS 36.133 are as follows:

Actions related to CSI reporting.
Actions related to an SCell deactivator timer (an sCell-DeactivationTimer) associated with the SCell.

In addition, when the user equipment receives a deactivation command to an SCell in subframe n or an SCell deactivation timer associated with the SCell expires in subframe n, the operations, except for actions related to CSI reporting to be applied in subframe n+8, may be applied no later than the above-stated minimum requirements. (When a UE receives a deactivation command to a secondary cell or the sCellDeactivationTimer associated with the secondary cell expires in subframe n, the corresponding actions in [36.321] shall apply no later than the minimum requirement defined in [36.133], except for the actions related to CSI reporting which shall be applied in subframe n+8.)

The minimum requirements may be set as follows:

In the case SCell activation delay requirements, the user equipment may be able to transmit a valid measurement report for a period, such as a max (5 measCycleSCell, 5 DRX cycles), before receiving an SCell activation command. The user equipment may be able to apply actions no later than subframe n+24 when SCell remains in a detectable state, or otherwise, may be able to apply actions no later than subframe n+34. (Upon receiving SCell activation command in subframe n, the UE shall be capable to transmit valid CSI report and apply actions related to the activation command as specified for the SCell being activated no later than in subframe n+24 provided the following conditions are met for the SCell:

During the period equal to max (5 measCycleSCell, 5 DRX cycles) before the reception of the SCell activation command:
the UE has sent a valid measurement report for the SCell being activated, and
the SCell being activated remains detectable according to the cell identification conditions specified in section 8.3.3.2.
SCell being activated also remains detectable during the SCell activation delay according to the cell identification conditions specified in section 8.3.3.2.

Otherwise upon receiving the SCell activation command in subframe n, the UE shall be capable to transmit valid CSI report and apply actions related to the activation command to the SCell being activated no later than in subframe n+34 provided the SCell may be successfully detected on the first attempt.)

In the case of the SCell deactivation delay requirements, the user equipment may accomplish the operations no later than subframe n+8.

(Upon receiving SCell deactivation command or upon expiry of the sCellDeactivationTimer in subframe n, the UE shall accomplish the deactivation actions for the SCell being deactivated no later than in subframe n+8.)

When the activation order is received as described above, the user equipment may perform an activation operation (e.g. CQI, PMI, RI, and PTI reporting for the SCell) related to the transmission of channel state information in a fixed point in time (e.g. in subframe n+8). Otherwise, when a deactivation order is received, the user equipment may transmit channel state information until a fixed point in time (for example, until subframe n+7 before subframe n+8, or in another example, until subframe 8+8). Otherwise, when the deactivation order is received, the user equipment may perform a related deactivation operation (e.g. no reporting of CQI, PMI, RI, or PTI for the SCell) related to channel state information transmission (CSI reporting) at a fixed point in time (e.g. in subframe n+8). This is intended to align/synchronize the activation and deactivation operations for the corresponding SCell between the user equipment and the base station. This may reduce the complexity of decoding of the base station. This may also prevent undesired operations of the user equipment. In addition, channel state information for transmission/retransmission scheduling through the SCell may be obtained at a fixed time.

When the PUCCH SCell is provided in the user equipment, the user equipment transmits the channel state information of the PUCCH SCell or the SCells belonging to the secondary PUCCH group through the corresponding PUCCH SCell.

However, when the PUCCH SCell is not activated at the above-stated fixed point in time, the user equipment that has received the activation command may not transmit the channel state information at the fixed point in time. In addition, since the PUCCH SCell may be deactivated before the above-stated fixed point in time, a channel state information transmission may not be performed before the fixed point in time.

That is, when the PUCCH is provided through the SCell, the user equipment may transmit the channel state information of the PUCCH SCell or the SCells belonging to the PUCCH SCell through the corresponding PUCCH SCell. However, when the PUCCH SCell is activated, the user equipment may not transmit the channel state information through the PUCCH SCell during a delay period in which the user equipment receives the activation command to the PUCCH SCell and activates the cell. This may consequently increase the complexity of decoding of the base station or lower the efficiency of scheduling, which is problematic. In addition, after the delay period in which the user equipment receives the activation command to the PUCCH SCell and activates the cell, the user equipment may not transmit the channel state information through the PUCCH SCell. This may consequently increase the complexity of decoding of the base station or lower the efficiency of scheduling, which is problematic.

To overcome this problem, the present disclosure is intended to provide a specific method and device for applying activation/deactivation to a PUCCH SCell when the user equipment performs a PUCCH transmission through an SCell. In addition, provided are a method and device able to effectively control the activation or deactivation timing of an SCell between user equipment and a base station.

1. Embodiment of Activation Operation of PUCCH SCell

The base station may properly manage the activation and deactivation of the SCells. Thus, while the PUCCH SCell is in a deactivated state, the other SCells belonging to the corresponding PUCCH SCell may be managed not to be activated. That is, when the PUCCH SCell is in the deactivated state, the SCells belonging to a secondary PUCCH group including the corresponding PUCCH SCell are configured to be in deactivated states.

For example, in the case in which the other SCells belonging to the PUCCH SCell are intended to be activated, when the corresponding PUCCH SCell is activated, the base station may instruct a change in the activation state of the other SCells. Alternatively, the base station may activate the other SCells, in addition to an instruction to activate the PUCCH SCell.

In addition, when the PUCCH SCell is activated and when the other SCells belonging to the PUCCH SCell are intended to be activated, problems may occur depending on the operation of the SCell deactivation timer (e.g. sCellDeactivationTimer).

For example, the SCell deactivation timer may be included in MAC configuration information and be provided in the user equipment. Although the SCell deactivation timer may be configured to have a single value when one or more SCells are provided in the user equipment, each of the SCells operates independently. Thus, when the other SCells belonging to the PUCCH SCell are activated in the deactivated state of the PUCCH SCell, an application of the SCell deactivation timer to the PUCCH SCell may cause the timer to expire prematurely, thereby deactivating the PUCCH SCell, which is problematic.

To overcome this problem, according to embodiments of the present disclosure, the PUCCH SCell may be configured such that the operation of the SCell deactivation timer, applied to typical SCells, is not applied thereto.

In an example thereof, the SCell deactivation timer of the PUCCH SCell may be set to start or restart when another SCell belonging to the PUCCH SCell is activated. In this case, the SCell deactivation timer of the PUCCH SCell may start or restart in response to the SCell being activated, thereby preventing the PUCCH SCell from being deactivated in the state in which the SCell is activated.

In another example, an SCell deactivation timer dedicated to the PUCCH SCell may be set to an infinite value. That is, when the PUCCH SCell is changed to an activated state, the SCell deactivation timer having the infinite value may prevent the PUCCH SCell from being changed to a deactivated state due to the expiration of the timer.

In another example, an SCell deactivation timer may be dedicated to the PUCCH SCell and be set to an infinite value. The dedicated SCell deactivation timer may be set to not operate.

In another example, the SCell deactivation timer of typical MAC configuration information may not be applied to the PUCCH SCell. For example, the corresponding SCell deactivation timer may be configured such that the SCell deactivation timer is not applied to the PUCH SCell while being applied to the other SCells.

In another example, the PUCCH SCell may be deactivated by receiving an MAC control element that deactivates an SCell in which a PUCCH is provided in an MAC level, without applying the SCell deactivation timer of typical MAC configuration information. Alternatively, in an RRC level, the user equipment may be triggered to release the corresponding SCell or the base station may release the SCell by receiving an SCell release instruction.

In addition, a variety of methods, other than the above-described methods, may be set to the PUCCH SCell to exclude the application of the operation of the SCell deactivation timer that has been applied to typical SCells according to the related art.

Hereinafter, the operation of the user equipment when activating the PUCCH SCell will be described.

(1) Performance of Actions Related to Transmission of Channel State Information in n+8

When the user equipment receives an activation command to the PUCCH SCell in subframe n, one or more of the following actions corresponding to activation are applied to subframe n+8.

Actions related to CSI reporting (CQI, PMI, RI, and PTI reporting for the SCell); and Actions related to an SCell deactivation timer when the SCell deactivation timer which is applied is associated with the PUCCH SCell.

The other actions corresponding to activation (e.g. at least one action among SRS transmission in the SCell, PDCCH monitoring in the SCell, and PDCCH monitoring for the SCell) are applied no later than the above-stated minimum requirements and no earlier than subframe n+8.

In an example thereof, when the PUCCH SCell is provided and when the PUCCH SCell is activated within the above-stated minimum requirements after subframe n+8 (e.g. no later than subframe n+24 or no later than subframe n+34), actions related to channel state information transmission may be applied through the PCell or an activated serving cell in subframe n+8 before the PUCCH SCell is activated. Specifically, periodic channel state information transmission may be performed through the PCell using the PUCCH in subframe n+8. Alternatively, periodic channel state information transmission may be performed through the PCell or an activated serving cell using the PUSCH in subframe n+8. When the user equipment is not configured for simultaneous transmission of the PUSCH and the PUCCH, the user equipment may periodically transmit channel state information through the PUSCH of a serving cell having a minimum serving cell index (a smallest ServCellIndex) in a subframe having a PUSCH allocation. Alternatively, aperiodic channel state information transmission may be performed through the PCell or the activated serving cell using the PUSCH in subframe n+8.

In another example, even when the PUCCH SCell is provided and when the PUCCH SCell is activated within the above-stated minimum requirements after subframe n+8 (e.g. no later than subframe n+24 or no later than subframe n+34), no actions related to channel state information transmission may be applied through the PCell or another activated serving cell until a subframe before activation after subframe n+8 (e.g. from subframe n+9).

In another example, even when the PUCCH SCell is provided and when the PUCCH SCell is activated within the above-stated minimum requirements after subframe n+8 (e.g. no later than subframe n+24 or no later than subframe n+34), actions related to channel state information transmission may be applied through the PCell or another activated serving cell until a subframe before activation after subframe n+8 (e.g. from subframe n+9). Specifically, periodic channel state information transmission may be performed through the PCell using the PUCCH within a corresponding period. In addition, periodic channel state information transmission may be performed through the PCell or the activated serving cell using the PUSCH within the corresponding period. Alternatively, aperiodic channel state information transmission may be performed through the PCell or the activated serving cell using the PUSCH within the corresponding period.

In another example, even when the PUCCH SCell is provided and when the PUCCH SCell is activated within the above-stated minimum requirements after subframe n+8 (e.g. no later than subframe n+24 or no later than subframe n+34), actions related to channel state information transmission may be applied through the PCell or another activated serving cell using the PUSCH until a subframe before activation from subframe n+8. For example, although actions related to channel state information transmission may not be performed through the PCell or another activated serving cell using the PUCCH, actions related to channel state information transmission may be applied through the PCell or another activated serving cell using the PUSCH until a subframe before activation from subframe n+8. Specifically, periodic channel state information transmission may be performed through the PCell or another activated serving cell using the PUSCH. Alternatively, periodic channel state information transmission may be performed through the PCell or another activated serving cell using the PUSCH.

In another example, even when the PUCCH SCell is provided and when the PUCCH SCell is activated within the above-stated minimum requirements after subframe n+8 (e.g. no later than subframe n+24 or no later than subframe n+34), the other actions corresponding to activation (e.g. at least one action among SRS transmission in the SCell, PDCCH monitoring in the SCell, and PDCCH monitoring for the SCell) may be applied no later than the minimum requirements and no earlier than subframe n+8.

In another example, even when the PUCCH SCell is provided and when the PUCCH SCell is activated within the above-stated minimum requirements after subframe n+8

(e.g. no later than subframe n+24 or no later than subframe n+34), the other actions corresponding to activation (e.g. at least one action among SRS transmission in the SCell, PDCCH monitoring in the SCell, and PDCCH monitoring for the SCell) are applied no later than the minimum requirements and no earlier than a subframe subjected to activation.

In another example, even when the PUCCH SCell is provided and when the PUCCH SCell is activated within the above-stated minimum requirements after subframe n+8 (e.g. no later than subframe n+24 or no later than subframe n+34), the other actions corresponding to activation (e.g. at least one action among SRS transmission in the SCell, PDCCH monitoring in the SCell, and PDCCH monitoring for the SCell) may be applied no later than the minimum requirements and no earlier than a subframe in which actions related to channel state information transmission have been performed.

In another example, even when the PUCCH SCell is provided and when the PUCCH SCell is activated the above-stated minimum requirements after subframe n+8 (e.g. no later than subframe n+24 or no later than subframe n+34), the other actions corresponding to activation (e.g. at least one action among SRS transmission in the SCell, PDCCH monitoring in the SCell, and PDCCH monitoring for the SCell) may be applied no later than the minimum requirements and no earlier than a subframe, the number of which is obtained by adding 1 to the number of a subframe in which actions related to CSI reporting have been performed.

(2) Embodiment of Performance of Actions Related to CSI Reporting in Activation

When the user equipment receives an activation command to the PUCCH SCell in subframe n, actions related to channel state information transmission corresponding to activation (e.g. CQI, PMI, RI, and PTI reporting for the SCell) are applied no later than the above-stated minimum requirements and no earlier than subframe n+8.

In addition, when the user equipment receives an activation command to the PUCCH SCell in subframe n, actions related to channel state information transmission corresponding to activation are applied no later than the minimum requirements and no earlier than a subframe subjected to activation (or to the subframe subjected to activation, from the subframe subjected to activation, or to a subframe performing actions corresponding to activation; hereinafter referred to as the subframe subjected to activation for the convenience of explanation).

In addition, the other actions corresponding to activation (e.g. at least one action among SRS transmission in the SCell, PDCCH monitoring in the SCell, and PDCCH monitoring for the SCell) are applied no later than the minimum requirements and no earlier than subframe n+8.

In an example, when the PUCCH SCell is provided and when the PUCCH SCell is activated within the minimum requirements (e.g. no later than subframe n+24 or no later than subframe n+34) from subframe n+8, no actions related to channel state information transmission may be applied before activation. Specifically, before the PUCCH SCell is activated, periodic channel state information transmission using the PUCCH may not be applied. In addition, before the PUCCH SCell is activated, periodic channel state information transmission using the PUSCH may not be applied. In addition, before the PUCCH SCell is activated, aperiodic channel state information transmission using the PUSCH may not be applied. In addition, periodic channel state information transmission may be applied in the PUCCH SCell from a subframe, in which the PUCCH SCell is activated, using the PUCCH. In addition, from a subframe in which the PUCCH SCell is activated, periodic channel state information transmission may be applied using the PUSCH of the SCell belonging to a secondary PUCCH group. In addition, from a subframe in which the PUCCH SCell is activated, aperiodic channel state information transmission may be applied through the PUSCH of the SCell belonging to the secondary PUCCH group.

In another example, when the user equipment receives an activation command to the PUCCH SCell in subframe n, actions related to channel state information transmission corresponding to activation (e.g. CQI, PMI, RI, and PTI reporting for the SCell) are applied no later than the above-stated minimum requirements and no earlier than subframe n+8. Specifically, when a subframe in which the PUCCH SCell is activated is referred to as subframe n+j (where j is an integer satisfying the formula: $7<j<24$ or $7<j<34$), a portion of actions corresponding to activation (e.g. SRS transmission in the SCell) may be applied in subframe n+j in which the PUCCH SCell is activated. Accordingly, the base station may instruct a channel state information transmission through the PUCCH SCell in subframe n+j+1 (or after subframe n+j+1). Then, in subframe n+j+1, the user equipment may perform PDCCH monitoring in the SCell or PDCCH monitoring for the SCell. In addition, PDCCH monitoring in the SCell or PDCCH monitoring for the SCell may also be performed in subframe n+j. The user equipment may perform channel state information transmission through the PUCCH SCell in subframe n+j+5. In addition, the user equipment may perform channel state information transmission through the PUCCH SCell in subframe n+j+4.

In addition, as described above, the SCell deactivation timer may not be applied to the PUCCH SCell, or a value applied to the PUCCH SCell may differ from a typical value applied to the SCell.

When the SCell deactivation timer associated with the PUCCH SCell is applied, actions related to the SCell deactivation timer are applied in subframe n+8. In addition, when the SCell deactivation timer associated with the PUCCH SCell is applied, actions related to the SCell deactivation timer are applied no later than the above-stated minimum requirements and no earlier than subframe n+8. In addition, when the SCell deactivation timer associated with the PUCCH SCell is applied, actions related to the SCell deactivation timer are applied no later than the above-stated minimum requirements and no earlier than the activated subframe.

2. Embodiment of Activation Operation of Other SCell(s) Belonging to PUCCH SCell The base station may properly manage the activation and deactivation of the SCells. Thus, while the PUCCH SCell is in a deactivated state, the base station may control the other SCells belonging to the corresponding PUCCH SCell not to be activated.

In an example, when the base station attempts to activate the other SCells belonging to the PUCCH SCell, the PUCCH SCell may be in the activated state.

In another example, when the base station attempts to activate the other SCells belonging to the PUCCH SCell, the PUCCH SCell may be in the activated state no later than minimum requirements as stated above.

In another example, when the base station attempts to activate the other SCells belonging to the PUCCH SCell, the SCells may be activated together with the PUCCH SCell of the secondary PUCCH group to which the corresponding SCells belong. For reference, an activation/deactivation MAC control element may discriminately indicate the activation and deactivation of each SCell. Thus, the base station may activate both the PUCCH SCell and the other SCells belonging to the PUCCH SCell.

Hereinafter, the operation of the user equipment when activating the other SCell(s) belonging to the PUCCH SCell will be described.

(1) Embodiment of Performance of Actions Related to CSI Reporting in n+8

In an example, when the user equipment receives an activation command to the other SCells belonging to the PUCCH SCell in subframe n, in the activated state of the PUCCH SCell, the following actions corresponding to activation of the other SCells belonging to the PUCCH SCell are applied in subframe n+8:

Actions related to CSI reporting (CQI, PMI, RI, and PTI reporting for the SCell); and Actions related to the SCell deactivation timer.

The other actions (e.g. at least one action among SRS transmission in the SCell, PDCCH monitoring in the SCell, and PDCCH monitoring for the SCell), corresponding to activation of the other SCells belonging to the PUCCH SCell, are applied no later than the above-stated minimum requirements and no earlier than subframe n+8.

In another example, when the user equipment receives an activation command to the other SCells belonging to the PUCCH SCell, at least one action among the following actions corresponding to activation of the other SCells belonging to the PUCCH SCell are applied in subframe n+8:

Actions related to CSI reporting (CQI, PMI, RI, and PTI reporting for the SCell); and Actions related to the SCell deactivation timer.

The other actions (e.g. at least one action among SRS transmission in the SCell, PDCCH monitoring in the SCell, and PDCCH monitoring for the SCell), corresponding to activation of the other SCells belonging to the PUCCH SCell, are applied no later than the above-stated minimum requirements and no earlier than subframe n+8.

Specifically, when an MAC control element indicating an activation state of another SCell belonging to the PUCCH SCell is received, the user equipment may perform a channel state information transmission operation in the eighth subframe after a subframe in which the MAC control element indicating the activated state is received when the PUCCH SCell is in an activated state or may perform the channel state information transmission operation in the eighth subframe regardless of the activation state of the PUCCH SCell.

Hereinafter, the embodiment will be described in more detail.

In an example, when the PUCCH SCell is activated together with the other SCells belonging to the corresponding PUCCH SCell, the PUCCH SCell may be activated within the above-stated minimum requirements after subframe n+8 (e.g. no later than subframe n+24 or no later than subframe n+34). In this case, before the PUCCH SCell is activated, actions related to channel state information transmission may be applied through the PCell or an activated serving cell in subframe n+8. Specifically, periodic channel state information transmission may be performed through the PCell using the PUCCH. In addition, periodic channel state information transmission may be performed through the PCell or the activated serving cell using the PUSCH. In addition, aperiodic channel state information transmission may be performed through the PCell or the activated serving cell using the PUSCH in subframe n+8.

In another example, when the PUCCH SCell is activated together with the other SCells belonging to the corresponding PUCCH SCell, the PUCCH SCell may be activated within the above-stated minimum requirements after subframe n+8 (e.g. no later than subframe n+24 or no later than subframe n+34). In this case, no actions related to channel state information transmission may be applied through the PCell or another activated serving cell until a subframe before activation of the PUCCH SCell after subframe n+8 (e.g. from subframe n+9).

In another example, when the PUCCH SCell is activated together with the other SCells belonging to the corresponding PUCCH SCell, the PUCCH SCell may be activated within the above-stated minimum requirements after subframe n+8 (e.g. no later than subframe n+24 or no later than subframe n+34). In this case, actions related to channel state information transmission may be applied through the PCell or another activated serving cell until a subframe before activation of the PUCCH SCell after subframe n+8 (e.g. from subframe n+9). Specifically, periodic channel state information transmission may be performed through the PCell using the PUCCH. In addition, periodic channel state information transmission may be performed through the PCell or the activated serving cell using the PUSCH. In addition, aperiodic channel state information transmission may be performed through the PCell or the activated serving cell using the PUSCH.

In another example, when the PUCCH SCell is activated together with the other SCells belonging to the corresponding PUCCH SCell, the PUCCH SCell may be activated within the above-stated minimum requirements after subframe n+8 (e.g. no later than subframe n+24 or no later than subframe n+34). In this case, before the PUCCH SCell is activated, the other actions (e.g. at least one action among SRS transmission in the SCell, PDCCH monitoring in the SCell, and PDCCH monitoring for the SCell), corresponding to activation of the other SCells belonging to the PUCCH SCell, are applied no later than the above-stated minimum requirements and no earlier than a subframe in which the PUCCH SCell is activated.

In another example, when the PUCCH SCell is activated together with the other SCells belonging to the corresponding PUCCH SCell, the PUCCH SCell may be activated within the above-stated minimum requirements after subframe n+8 (e.g. no later than subframe n+24 or no later than subframe n+34). In this case, before the PUCCH SCell is activated, the other actions (e.g. at least one action among SRS transmission in the SCell, PDCCH monitoring in the SCell, and PDCCH monitoring for the SCell), corresponding to activation of the other SCells belonging to the PUCCH SCell, are applied no later than the minimum requirements and no earlier than a subframe in which the actions related to channel state information transmission are performed.

In another example, when the PUCCH SCell is activated together with the other SCells belonging to the corresponding PUCCH SCell, the PUCCH SCell may be activated within the above-stated minimum requirements after subframe n+8 (e.g. no later than subframe n+24 or no later than subframe n+34). In this case, before the PUCCH SCell is activated, the other actions (e.g. one or more actions of SRS transmission in the SCell, PDCCH monitoring in the SCell, and PDCCH monitoring for the SCell), corresponding to activation of the other SCells belonging to the PUCCH SCell, are applied no later than the minimum requirements and no earlier than a subframe, the number of which is obtained by adding 1 to the number of a subframe in which the actions related to channel state information transmission have been performed.

(2) Embodiment of Performance of Actions Related to Channel State Information Transmission of SCells Belonging to PUCCH SCell, in Activation of PUCCH SCell In an example, when the user equipment receives an activation command to the other SCells belonging to the PUCCH SCell in subframe n, actions related to channel state information transmission (e.g. CQI, PMI, RI, and PTI reporting for the SCell), corresponding to activation of the other SCells belonging to the PUCCH SCell, are applied no later than the above-stated minimum requirements and no earlier than subframe n+8.

In another example, when an activation command to the other SCells belonging to the PUCCH SCell is received in subframe n, actions related to channel state information transmission (e.g. CQI, PMI, RI, and PTI reporting for the SCell), corresponding to activation of the other SCells belonging to the PUCCH SCell, are applied no later than the above-stated minimum requirements and no earlier than (or in or from) a subframe in which the PUCCH SCell is activated.

In addition, the other actions (e.g. at least one action among SRS transmission in the SCell, PDCCH monitoring in the SCell, and PDCCH monitoring for the SCell), corresponding to activation of the other SCells belonging to the PUCCH SCell, are applied no later than the above-stated minimum requirements and no earlier than subframe n+8.

When the PUCCH SCell is activated together with the other SCells belonging to the PUCCH SCell, the PUCCH SCell may be activated within the above-stated minimum requirements after subframe n+8 (e.g. no later than subframe n+24 or no later than subframe n+34). In this case, no actions related to channel state information transmission may be applied before the PUCCH SCell is activated. Specifically, before the PUCCH SCell is activated, periodic channel state information transmission to the other SCells belonging to the corresponding PUCCH SCell through the PUCCH may not be applied. In addition, before the PUCCH SCell is activated, periodic channel state information transmission to the other SCells belonging to the corresponding PUCCH SCell through the PUSCH may not be applied. In addition, before the PUCCH SCell is activated, aperiodic channel state information transmission to the other SCells belonging to the corresponding PUCCH SCell through the PUSCH may not be applied.

In addition, actions related to the SCell deactivation timer for the other SCells belonging to the PUCCH SCell are applied in subframe n+8. In addition, actions related to the SCell deactivation timer for the other SCells belonging to the PUCCH SCell are applied no later than the above-stated minimum requirements and no earlier than subframe n+8. In addition, actions related to the SCell deactivation timer for the other SCells belonging to the PUCCH SCell are applied no later than the above-stated minimum requirements and no earlier than a subframe in which the corresponding PUCCH SCell is activated.

3. PUCCH SCell Deactivation Operation

The base station may properly manage the activation and deactivation of the SCells. Thus, while the PUCCH SCell is in a deactivated state, the other SCells belonging to the PUCCH SCell may be managed not to be activated.

For example, when deactivating the PUCCH SCell, the base station may also deactivate the other SCells belonging to the PUCCH SCell.

Hereinafter, operations of the user equipment for deactivating the PUCCH SCell will be described.

(1) Embodiment of Deactivation Actions Related to Channel State Information Transmission in n+8

When the user equipment receives a deactivation command to the PUCCH SCell in subframe n or an SCell deactivation timer associated with the PUCCH SCell expires in subframe n, actions related to channel state information transmission (e.g. no reporting of CQI, PMI, RI, or PTI for the SCell) are applied in subframe n+8.

The other actions corresponding to deactivation for the PUCCH SCell (e.g. at least one action among no SRS transmission in the SCell, no UL-SCH transmission in the SCell, no RACH transmission in the SCell, stopping of PDCCH monitoring in the SCell, and stopping of PDCCH monitoring for the SCell) are applied no later than predetermined minimum requirements (e.g. subframe n+8).

For example, the PUCCH SCell may be deactivated within minimum requirements (e.g. no later than subframe n+8, i.e. subframe n+k, where k is an integer satisfying the formula: 0<k<7). In this case, since actions related to channel state information transmission are applied in subframe n+8, a channel state information transmission operation for the PUCCH SCell (e.g. CQI, PMI, RI, and PTI reporting for the SCell) may be performed in subframe n+7, from a deactivated subframe to subframe n+7, or until subframe n+7. In this regard, the actions related to channel state information transmission may be applied through the PCell or an activated serving cell, in subframe n+7, from a deactivated subframe to subframe n+7, or until subframe n+7. Specifically, periodic channel state information may be transmitted through the PCell using the PUCCH, in subframe n+7, from a deactivated subframe to subframe n+7, or until subframe n+7. In addition, periodic channel state information may be transmitted through the PCell or the activated serving cell using the PUSCH, in subframe n+7, from a deactivated subframe to subframe n+7, or until subframe n+7. In addition, aperiodic channel state information may be transmitted through the PCell or the activated serving cell using the PUSCH, in subframe n+7, from a deactivated subframe to subframe n+7, or until subframe n+7.

(2) Embodiment of Performance of Deactivation Actions Related to Channel State Information Transmission in Deactivation When a deactivation command to the PUCCH SCell is received in subframe n or an SCell deactivation timer associated with the PUCCH SCell expires in subframe n, the user equipment may apply actions related to channel state information transmission (e.g. no reporting of CQI, PMI, RI, or PTI for the SCell) no later than predetermined minimum requirements (e.g. subframe n+8).

In addition, when a deactivation command to the PUCCH SCell is in subframe n or an SCell deactivation timer associated with the PUCCH SCell expires in subframe n, the user equipment applies actions related to channel state information transmission (e.g. no reporting of CQI, PMI, RI, or PTI for the SCell) no later than a subframe subjected to deactivation (e.g. in a subframe subjected to deactivation, from a subframe subjected to deactivation, or in a subframe in which actions corresponding to deactivation are performed).

The other actions corresponding to deactivation for the PUCCH SCell (e.g. at least one action among no SRS transmission in the SCell, no UL-SCH transmission in the SCell, no RACH transmission in the SCell, stopping of PDCCH monitoring in the SCell, and stopping of PDCCH monitoring for the SCell) are applied no later than the above-stated minimum requirements (e.g. subframe n+8). Specifically, no deactivation actions related to channel state information transmission may be applied from a subframe in which the PUCCH SCell is deactivated to subframe n+7. In addition, periodic channel state information transmission through the PUCCH may not be performed from a subframe in which the PUCCH SCell is deactivated to subframe n+7. In addition, periodic channel state information transmission through the PUSCH may not be performed from the subframe in which the PUCCH SCell is deactivated to subframe n+7. In addition, aperiodic channel state information transmission through the PUSCH may not be performed from the subframe in which the PUCCH SCell is deactivated to subframe n+7.

4. Deactivation Actions for SCell(s) Belonging to PUCCH SCell

The base station may properly manage the activation and deactivation of the SCells. Thus, while the PUCCH SCell is in a deactivated state, the base station may control the other SCells belonging to the corresponding PUCCH SCell not to be activated.

For example, when deactivating the PUCCH SCell, the base station may also deactivate the other SCells belonging to the corresponding PUCCH SCell.

Hereinafter, operations of the user equipment when deactivating the SCell(s) belonging to the PUCCH SCell will be described.

(1) Embodiment of Performance of Deactivation Actions Related to Channel State Information Transmission in n+8

When the user equipment receives a deactivation command to an SCell belonging to the PUCCH SCell in subframe n or an SCell deactivation timer associated with a specific SCell expires in subframe n, actions related to channel state information transmission (e.g. no reporting of CQI, PMI, RI, or PTI for the SCell), for the SCell belonging to the PUCCH SCell, are applied in subframe n+8.

The other actions corresponding to deactivation (e.g. at least one action among no SRS transmission in the SCell, no UL-SCH transmission in the SCell, no RACH transmission in the SCell, stopping of PDCCH monitoring in the SCell, and stopping of PDCCH monitoring for the SCell) are applied no later than minimum requirements (e.g. subframe n+8).

Specifically, when the PUCCH SCell is deactivated together with the other SCells belonging to the corresponding PUCCH SCell, the PUCCH SCell may be deactivated within the above-stated minimum requirements (e.g. no later than subframe n+8, i.e. subframe n+k, where k is an integer satisfying the formula: 0<k<7). In this case, since actions related channel state information transmission (e.g. no reporting of CQI, PMI, RI, or PTI for the SCell) are applied in subframe n+8, a channel state information transmission action (e.g. CQI, PMI, RI, and PTI reporting for the SCell) for the SCell belonging to the PUCCH SCell may be performed in subframe n+7, from a deactivated subframe to subframe n+7, or until subframe n+7. In this regard, actions related to channel state information transmission may be applied through the PCell or an activated serving cell, in subframe n+7, from a deactivated subframe to subframe n+7, or until subframe n+7.

In an example, periodic channel state information transmission may be performed through the PCell using the PUCCH, in subframe n+7, from a deactivated subframe to subframe n+7, or until subframe n+7.

In another example, periodic channel state information transmission may be performed through the PCell or the activated serving cell using the PUSCH, in subframe n+7, from a deactivated subframe to subframe n+7, or until subframe n+7.

In another example, aperiodic channel state information transmission may be performed through the PCell or the activated serving cell using the PUSCH, in subframe n+7, from a deactivated subframe to subframe n+7, or until subframe n+7.

(2) Embodiment of Performance of Deactivation Actions Related to CSI Reporting in Deactivation When the user equipment receives a deactivation command to an SCell belonging to the PUCCH SCell in subframe n or an SCell deactivation timer associated with the SCell expires in subframe n, actions related to channel state information transmission (e.g. no reporting of CQI, PMI, RI, or PTI for the SCell), for the SCell belonging to the PUCCH SCell, are applied no later than predetermined minimum requirements (e.g. subframe n+8).

In addition, when a deactivation command to the SCell belonging to the PUCCH SCell is received in subframe n or the SCell deactivation timer associated with the SCell expires in subframe n, actions related to channel state information transmission, for the SCell belonging to the PUCCH SCell, are applied no later than a subframe subjected to deactivation (or in the subframe subjected to deactivation, from the subframe subjected to deactivation, or in a subframe in which actions corresponding to deactivation are performed).

The other actions corresponding to deactivation for the PUCCH SCell (e.g. at least one action among no SRS transmission in the SCell, no UL-SCH transmission in the SCell, no RACH transmission in the SCell, stopping of PDCCH monitoring in the SCell, and stopping of PDCCH monitoring for the SCell) are applied no later than the above-stated minimum requirements (e.g. subframe n+8).

In an example, no deactivation actions related to channel state information transmission may be applied from a subframe in which the PUCCH SCell is deactivated to subframe n+7.

In another example, no periodic channel state information transmission through the PUCCH may be applied from the subframe in which the PUCCH SCell is deactivated to subframe n+7.

In another example, no periodic channel state information transmission through the PUSCH may be applied from the subframe in which the PUCCH SCell is deactivated to subframe n+7.

In another example, no aperiodic channel state information transmission through the PUSCH may be applied from the subframe in which the PUCCH SCell is deactivated to subframe n+7.

The above-described embodiments may be used alone or in combination with each other. In addition, information necessary for the performance of the above-described operations may be transmitted on an RRC message to the user equipment by the base station or may be previously set in the user equipment or the base station.

In addition, a subframe in which the PUCCH SCell is activated or a subframe in which actions corresponding to activation of the PUCCH SCell are performed, according to the above-described embodiments, may be dynamically determined according to minimum requirements. In addition, the corresponding subframe may be set to a fixed value (e.g. n+24 or n+34) to reduce the complexity between the user equipment and the base station. In addition, the corresponding subframe may be set to a fixed value that is shared using an RRC message.

Likewise, a subframe subjected to deactivation or a subframe in which actions corresponding to deactivation are performed, according to the above-described embodiments, may have a value that may vary according to minimum requirements. In addition, a fixed value (e.g. n+8) may be given to reduce the complexity between the user equipment and the base station. In addition, the subframe may be configured to have a fixed value to reduce the complexity between the user equipment and the base station using an RRC message.

Operations of the base station in accordance with at least one embodiment will be described with reference to the drawings.

Figure 4:
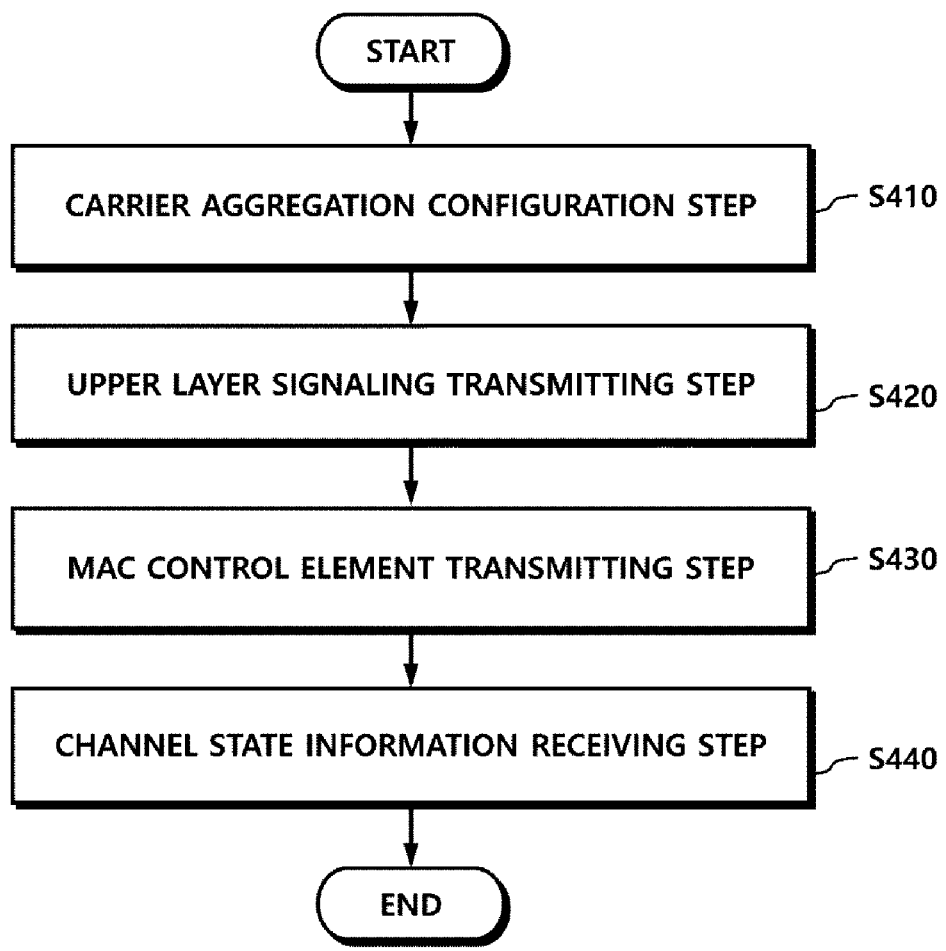
FIG. 4 illustrates operations of a base station according to an embodiment of the present disclosure.

FIG. 4 illustrates operations of a base station according to an embodiment of the present disclosure.

Referring to FIG. 4, provided is a method of receiving channel state information by a base station. In step S410, the base station configures carrier aggregation (CA) together with user equipment using a single PCell and a plurality of SCells controlled thereby. The base station may configure CA with the user equipment using a plurality of cells controlled thereby. For example, the base station may configure CA together with the user equipment using the single PCell and the plurality of SCell to communicate with the user equipment by CA. In addition, when the user equipment configures dual connectivity (DC), the base station may act as a master base station to communicate with the user equipment using a plurality of cells. In addition, when the user equipment configures DC, the base station may act as a secondary base station to communicate with the user equipment using a plurality of cells. In addition, when configuring CA using a plurality of cells, the base station configures one cell among the plurality of cells as a PCell and the other cells as SCells. The base station may transmit information necessary for the configuration of CA together with the user equipment to the user equipment. For example, the base station may transmit information regarding cells used in the configuration of CA to the user equipment.

In addition, in step S420, the base station transmits a higher layer signal including configuration information for configuring a PUCCH transmission function in at least one cell among the plurality of SCells. When CA is configured using the single PCell and the plurality of SCells, the base station may transmit configuration information for configuring the PUCCH SCell using at least one cell among the plurality of SCells, to the user equipment. That is, when the base station configures CA together with the user equipment using more than five cells, the base station may set a PUCCH transmission function to be configured by additionally selecting at least one SCell, except for the PCell that typically provides the PUCCH transmission function. In this regard, the base station transmits the configuration information, including information regarding the SCell that configures the PUCCH transmission function, to the user equipment. The configuration information as stated above may be transmitted through higher layer signaling (e.g. radio resource control (RRC) signaling). When the PUCCH SCell is configured, each of the plurality of SCells, except for the PUCCH SCell, may be configured to be mapped to one group of a primary PUCCH group and a secondary PUCCH group. In this case, at least one SCell mapped to the primary PUCCH group may transmit uplink control information including the channel state information through the PCell, while at least one SCell mapped to the secondary PUCCH group may transmit uplink control information including the channel state information through the PUCCH SCell. In this regard, the base station may additionally transmit information regarding at least one SCell mapped to the secondary PUCCH group through higher layer signaling. Two or more PUCCH SCells may be provided, and each of the SCells may be configured to transmit uplink control information through one of the two or more PUCCH SCells or the PUCCH SCell of the PCell.

In addition, in step S430, the base station transmits a MAC control element including activation state indication information regarding the PUCCH SCell having the PUCCH transmission function. Since the PUCCH SCell is an SCell, a change in state may be applied. For example, the PUCCH SCell may be configured to be in an activated state or a deactivated state, and a change in the state may be performed. In this regard, the base statin may transmit activation state indication information, indicating the activation state of the PUCCH SCell, to the user equipment. The activation state indication information may be transmitted on the MAC control element. The base station may transmit indication information to indicate activation state of the other SCells, except for the PUCCH SCell. Indication information indicating the activation state of the PUCCH SCell and indication information indicating the activation state of the other SCells may be simultaneously transmitted.

In addition, in step S440, the base station receives the channel state information in the PUCCH SCell after the PUCCH SCell is activated according to the activation state indication information. The user equipment may change the PUCCH SCell to an activated state according to the activation state indication information. In addition, when the activation state indication information indicates deactivation, the user equipment may change the PUCCH SCell to a deactivated state. For example, when the activation state indication information is received from subframe n, the user equipment may change the corresponding PUCCH SCell to the activated state in the $(n+8)^{th}$ subframe (i.e. the eighth subframe after n). A point in time at which the activation state of the PUCCH SCell is changed may be preset. For example, when the activation state indication information is received in subframe n, the user equipment may be changed to an activated state in a section ranging from subframe n+8 to subframe n+24 (or n+34).

After the PUCCH SCell is activated, the base station receives the transmitted channel state information. For example, the base station does not receive the channel state information when the PUCCH SCell is in the deactivated state but receives the channel state information only when the PUCCH SCell is changed to the activated state according to the activation state indication information. A point in time for transmitting the channel state information may be set to be the same as a point in time at which the PUCCH SCell is activated of or may be set to any section after the PUCCH SCell is converted to the activated state.

When the PUCCH SCell is configured to be in the deactivated state, the SCells belonging to the secondary PUCCH group, in which the channel state information is transmitted through the corresponding PUCCH SCell, may also be configured to be in a deactivated state. That is, it may be determined whether or not to change the activation state of the SCells belonging to the corresponding secondary PUCCH group, depending on the activation state of the PUCCH SCell belonging to the corresponding secondary PUCCH group. In other words, when the PUCCH SCell is configured to be in the deactivated state, the SCells of the secondary PUCCH group are also configured to be in the deactivated state. In this regard, the base station may determine whether or not to change the activation state of the PUCCH SCell by considering the activation state of the SCells belonging to the secondary PUCCH group. In addition, the base station may determine whether or not to change the activation state of the SCells belonging to the secondary PUCCH group by considering the activation state of the PUCCH SCell.

In addition, the PUCCH SCell may be changed from the deactivated state to the activated state without an SCell deactivation timer being applied. Unlikely, when each of the SCells belonging to the secondary PUCCH group is changed from the deactivated state to the activated state, the SCell deactivation timer is applied. When the SCell deactivation timer expires, the SCell belonging to the secondary PUCCH group enters the deactivated state. Thus, the activation state of the PUCCH SCell may only be changed in response to control by the base station, unlike the other SCells. The SCell deactivation timer may be provided in the user equipment in advance or according to the setting of the base station. When the provided SCell deactivation timer enters the activated state, the SCells, except for the PUCCH SCell, may be applied and start.

As set forth above, regarding the user equipment performing PUCCH transmission in an SCell, the present disclosure provides a specific method of applying activation/deactivation to a PUCCH SCell and a method of effectively controlling the activation or deactivation timing of the SCell between the user equipment and the base station.

A description will be made about user equipment and a base station in which the operations of embodiments of the present disclosure as described above with reference to FIGS. 1 to 4 may be performed.

Figure 5:
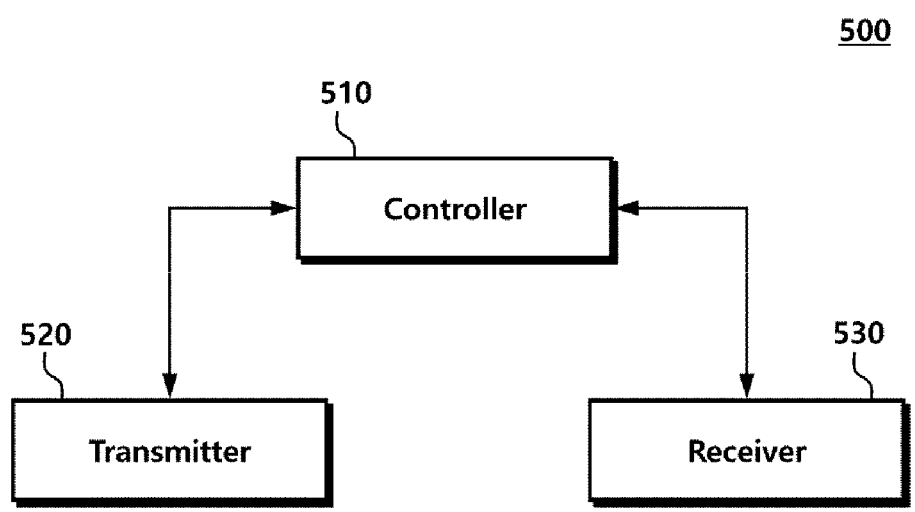
FIG. 5 illustrates operations of a terminal according to an embodiment of the present disclosure.

FIG. 5 illustrates configuration of user equipment according to an embodiment of the present disclosure.

Referring to FIG. 5, user equipment 500 includes a controller 510, a transmitter 520, and a receiver 530. The controller 510 configures CA using a single PCell and a plurality of SCells controlled by a base station. The receiver 530 receives a higher-level signal including configuration information for configuring a PUCCH transmission function in at least one SCell of the plurality of SCells and receives a MAC control element including activation state indication information regarding a PUCCH SCell having the PUCCH transmission function configured based on the configuration information. After the PUCCH SCell is activated according to the activation state indication information, the transmitter 520 transmits channel state information in the PUCCH SCell.

In addition, when the user equipment necessary for the accomplishment of embodiments of the present disclosure performs a PUCCH transmission through the SCell, the controller 510 controls an activation or deactivation operation of the PUCCH SCell while controlling the overall operation of the user equipment related to transmission of the channel state information according to activation or deactivation timing. In addition, the controller 510 configures CA or DC together with the base station while controlling the overall operation of the user equipment according to the foregoing embodiments to configure the PUCCH SCell and change the activation state of the PUCCH SCell based on configuration information or indication information received from the base station.

The transmitter 620 transmits uplink control information including the channel state information to the base station through the PUCCH SCell or the PCell. In addition, the transmitter 620 transmits uplink data and messages to the base station through the corresponding channel.

The receiver 610 may receive CA configuration information, configuration information, based on which the PUCCH SCell is configured, or indication information, based on which the activation state of the SCell configured in the user equipment is changed, from the base station through higher layer signaling or MAC signaling (e.g. by a MAC control element). In addition, the receiver 610 receives downlink control information, data, and messages from the base station through the corresponding channel.

Figure 6:
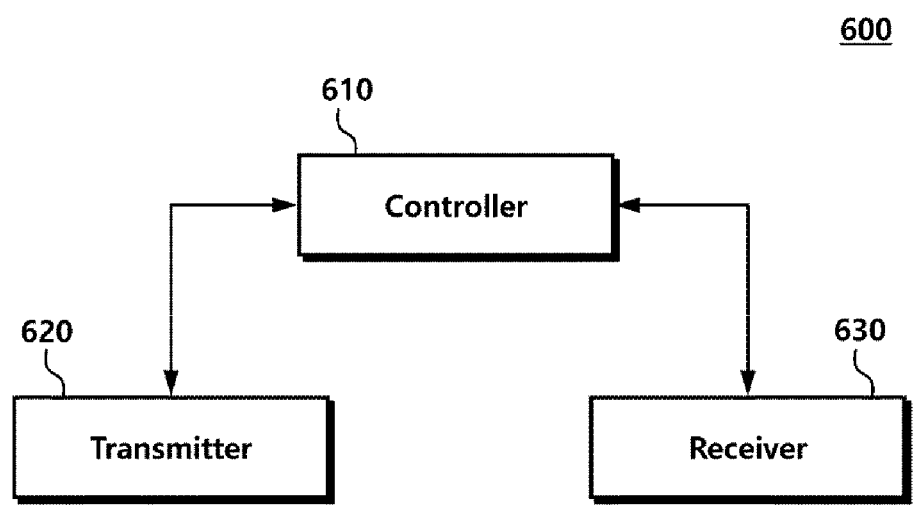
FIG. 6 illustrates a base station according to an embodiment of the present disclosure.

FIG. 6 illustrates configuration of a base station according to an embodiment of the present disclosure.

Referring to FIG. 6, a base station 600 includes a controller 610, a transmitter 620, and a receiver 630. The controller 610 configures CA together with user equipment using a single PCell and a plurality of SCells. The transmitter 620 transmits a higher layer signal to at least one SCell among the plurality of SCells, the higher layer signal including configuration information for configuring a PUCCH transmission function and transmits a MAC control element including activation state indication information to a PUCCH SCell having the PUCCH transmission function configured therein. After the PUCCH SCell is activated according to the activation state indication information, the receiver 630 receives channel state information in the PUCCH SCell.

When the user equipment necessary for the accomplishment of embodiments of the present disclosure performs a PUCCH transmission through the SCell, the controller 610 controls an activation or deactivation operation of the PUCCH SCell while controlling the overall operation of the base station related to reception of the channel state information according to activation or deactivation timing. In addition, the controller 610 may configure CA or DC in the user equipment while selecting or determining a PUCCH SCell.

The transmitter 620 may transmit CA configuration information, configuration information for configuring the PUCCH SCell, or indication information for indicating the activation state of the SCell configured in the user equipment is changed to the user equipment through higher layer signaling or MAC signaling (e.g. by a MAC control element).

The receiver 630 receives uplink control information including the channel state information from the user equipment through the PUCCH SCell or the PCell.

In addition, the transmitter 620 and the receiver 630 are used to transmit and receive signals, messages, and data, necessary for the accomplishment of embodiments of the present disclosure, to and from the user equipment.

The foregoing descriptions and the accompanying drawings have been presented in order to explain the certain principles of the present invention. A person skilled in the art to which the invention relates may make many modifications and variations by combining, dividing, substituting for, or changing the elements without departing from the principle of the invention. The foregoing embodiments disclosed herein shall be interpreted as illustrative only but not as limitative of the principle and scope of the invention. It should be understood that the scope of the invention shall be defined by the appended Claims and all of their equivalents fall within the scope of the invention.

The invention claimed is:

1. A method of transmitting channel state information by user equipment that configures carrier aggregation, the method comprising:
   configuring carrier aggregation using a single primary cell and a plurality of secondary cells controlled by a base station;
   receiving a higher layer signal including configuration information for configuring a physical uplink control channel (PUCCH) transmission function in at least one secondary cell among the plurality of secondary cells;

receiving a medium access control (MAC) control element including activation state indication information regarding a PUCCH secondary cell having the PUCCH transmission function configured based on the configuration information; and after the PUCCH secondary cell is activated according to the activation state indication information, transmitting channel state information in the PUCCH secondary cell, wherein a secondary cell deactivation timer for deactivation of an activated secondary cell is differently applied according to whether a type of the activated secondary cell is the PUCCH secondary cell; and wherein:

the secondary cell deactivation timer is applied when each secondary cell, except for the PUCCH secondary cell, included in a secondary PUCCH group to which the PUCCH secondary cell belongs is changed to an activated state; and the secondary cell deactivation timer is not applied when the PUCCH secondary cell is changed to an activated state, wherein the plurality of secondary cells except for the PUCCH secondary cell are respectively mapped to one of a primary PUCCH group and the secondary PUCCH group, wherein at least one secondary cell among the plurality of secondary cells, mapped to the primary PUCCH group, transmits channel state information through the primary cell, while at least one secondary cell among the plurality of secondary cells, mapped to the secondary PUCCH group, transmits channel state information through the PUCCH secondary cell, the secondary cell deactivation timer is configured to have a single value, wherein the plurality of secondary cells mapped to the primary PUCCH group and the plurality of secondary cells mapped to the secondary PUCCH group is applied the single value of the secondary cell deactivation timer, and wherein the PUCCH secondary cell is not applied the secondary cell deactivation timer.

2. The method according to claim 1, wherein the higher layer signal includes information regarding the at least one secondary cell mapped to the secondary PUCCH group.

3. The method according to claim 1, wherein, when the PUCCH secondary cell is in a deactivated state, at least one secondary cell among the plurality of secondary cells, transmitting channel state information through the PUCCH secondary cell, is configured to be in a deactivated state.

4. The method of claim 1, wherein the PUCCH secondary cell activated according to the activation state indication information is changed to a deactivated state according to an MAC control element including deactivation state indication information.

5. A method of receiving channel state information by a base station, the method comprising:

configuring, by the base station, carrier aggregation together with user equipment using a single primary cell and a plurality of secondary cells controlled thereby;

transmitting a higher layer signal including configuration information for configuring a PUCCH transmission function in at least one secondary cell among the plurality of secondary cells;

transmitting a MAC control element including activation state indication information regarding the PUCCH secondary cell having the PUCCH transmission function; and after the PUCCH secondary cell is activated according to the activation state indication information, receiving channel state information in the PUCCH secondary cell, wherein a secondary cell deactivation timer for deactivation of an activated secondary cell is differently applied according to whether a type of the activated secondary cell is the PUCCH secondary cell; and wherein:

the secondary cell deactivation timer is applied when each secondary cell, except for the PUCCH secondary cell, included in a secondary PUCCH group to which the PUCCH secondary cell belongs is changed to an activated state; and the secondary cell deactivation timer is not applied when the PUCCH secondary cell is changed to an activated state, wherein the plurality of secondary cells except for the PUCCH secondary cell are respectively mapped to one of a primary PUCCH group and the secondary PUCCH group, wherein at least one secondary cell among the plurality of secondary cells, mapped to the primary PUCCH group, transmits channel state information through the primary cell, while at least one secondary cell among the plurality of secondary cells, mapped to the secondary PUCCH group, transmits channel state information through the PUCCH secondary cell, the secondary cell deactivation timer is configured to have a single value, wherein the plurality of secondary cells mapped to the primary PUCCH group and the plurality of secondary cells mapped to the secondary PUCCH group is applied the single value of the secondary cell deactivation timer, and wherein the PUCCH secondary cell is not applied the secondary cell deactivation timer.

6. The method according to claim 5, wherein the higher layer signal includes information regarding the at least one secondary cell mapped to the secondary PUCCH group.

7. The method according to claim 5, wherein, when the PUCCH secondary cell is in a deactivated state, at least one secondary cell among the plurality of secondary cells, transmitting channel state information through the PUCCH secondary cell, is configured to be in a deactivated state.

8. The method of claim 5, wherein the PUCCH secondary cell activated according to the activation state indication information is changed to a deactivated state according to an MAC control element including deactivation state indication information.

9. User equipment transmitting channel state information, comprising:

a controller configured to configure carrier aggregation using a single primary cell and a plurality of secondary cells controlled by a base station;

a receiver configured to receive a higher-level signal including configuration information for configuring a PUCCH transmission function in at least one secondary cell of the plurality of secondary cells and receive a MAC control element including activation state indication information regarding a PUCCH secondary cell having the PUCCH transmission function configured based on the configuration information; and a transmitter configured to transmit channel state information in the PUCCH secondary cell after the PUCCH secondary cell is activated according to the activation state indication information, wherein a secondary cell deactivation timer for deactivation of an activated secondary cell is differently applied according to whether a type of the activated secondary cell is the PUCCH secondary cell; and wherein:

the secondary cell deactivation timer is applied when each secondary cell, except for the PUCCH secondary cell, included in a secondary PUCCH group to which the PUCCH secondary cell belongs is changed to an activated state; and the secondary cell deactivation timer is not applied when the PUCCH secondary cell is changed to an activated state, wherein the plurality of secondary cells except for the PUCCH secondary cell are respectively mapped to one of a primary PUCCH group and the secondary PUCCH group, at least one secondary cell among the plurality of secondary cells, mapped to the primary PUCCH group, transmits channel state information through the primary cell, while at least one secondary cell among the plurality of secondary cells, mapped to the secondary PUCCH group, transmits channel state information through the PUCCH secondary cell, the secondary cell deactivation timer is configured to have a single value, wherein the plurality of secondary cells mapped to the primary PUCCH group and the plurality of secondary cells mapped to the secondary PUCCH group is applied the single value of the secondary cell deactivation timer, and wherein the PUCCH secondary cell is not applied the secondary cell deactivation timer.

10. The user equipment according to claim 9, wherein the higher layer signal includes information regarding the at least one secondary cell mapped to the secondary PUCCH group.

11. The user equipment according to claim 9, wherein, when the PUCCH secondary cell is in a deactivated state, at least one secondary cell among the plurality of secondary cells, transmitting channel state information through the PUCCH secondary cell, is configured to be in a deactivated state.

12. The user equipment of claim 9, wherein the PUCCH secondary cell activated according to the activation state indication information is changed to a deactivated state according to an MAC control element including deactivation state indication information.

* * * * *